United States Patent Office 3,684,720
Patented Aug. 15, 1972

3,684,720
REMOVAL OF SCALE FROM SURFACES
Darwin W. Richardson, Richardson, Tex., assignor to The Western Company of North America, Fort Worth, Tex.
No Drawing. Filed Mar. 6, 1970, Ser. No. 17,342
Int. Cl. C02b 5/06
U.S. Cl. 252—86
23 Claims

ABSTRACT OF THE DISCLOSURE

A method of removing scale from surfaces such as piping and other equipment by treating the scale with a solution containing a scale converting agent and a chelating agent. The scale converting agent will ionize the scale material and the chelating agent will sequester ions of the scale very rapidly. For example, when removing calcium sulfate scale, the treating solution can contain ammonium bicarbonate as a scale converting agent and a di- or tri-ammonium salt of ethylene-diamine tetraacetic acid as the chelating agent.

---

This invention relates to the removal of scale from surfaces. In another aspect, this invention relates to a novel method of removing scale from surfaces. In still another aspect, this invention relates to a novel solution for treating surfaces and removing scale therefrom.

In oil and gas well operations, water insoluble scale is formed in tubing, casings, and associated equipment, as well as the well bore and the formation itself, which carry, at least in part, water or brine waters. These waters can contain insoluble calcium, barium, magnesium, and iron salts. Such salts include calcium sulfate (gypsum), barium sulfate, calcium carbonate (limestone), complex calcium phosphate (hydroxyapatite), and magnesium salts.

This scale causes many problems in oil and gas well drilling and treating operations, particularly when it builds up in the piping. Generally, the scale is deposited or formed from a pressure or temperature change in the piping. Such scale deposits inhibit the flow of fluids, such as oil, water and/or other treating fluids through the piping, and if left unchecked will result in a complete blockage of the pipe. In addition, along with the scale, sand silicates, and other inert materials, and in some instances, heavier fractions of crude oil are deposited and entrapped therein.

The removal of such scale is conventionally accomplished by two basic methods. The first method includes treatment of the scale with a scale converter which converts the scale to an acid soluble material followed by treatment with a mineral acid such as HCL. For example, insoluble sulfate scales are generally first reacted with a converter such as a carbonate to yield a water insoluble-acid soluble carbonate scale which is thereafter treated with the mineral acid. A second conventional method includes the use of chelating or sequestering agents, such as ethylenediamine tetraacetic acid or nitrilotriacetic acid.

The first basic method which utilizes a final mineral acid flush has many disadvantages because the mineral acids are corrosive to the piping and tubing, and such methods generally involve two or three step conversion processes which are pressure-sensitive. For example, the removal of a sulfate scale by the conventional converter-acid procedure generally involves a first step of converting the sulfate to a carbonate and a second step of dissolving the carbonate by an acid. Both steps are pressure sensitive because they involve the release of carbon dioxide. If it is desired to remove a phosphate scale, such as hydroxy-apatite, the phosphate scale is initially converted to a sulfate by treatment with sulfuric acid, and the water insoluble sulfate scale is then treated with a carbonate to yield an insoluble scale which in turn is treated with a mineral acid, such as hydrochloric acid to convert the carbonate scale to soluble chlorides and carbon dioxides. Thus, this method is also pressure sensitive and is generally ineffective under higher pressure conditions.

The use of the sequestering agent such as disclosed above, is conventionally a one-step operation. However, the sequestering agent acts very slowly and under critical pH conditions to dissolve the scale and thereby results in relatively long shut-down periods for the well treating operation, for example.

Therefore, one object of this invention is to provide an improved method of removing water insoluble scales from surfaces.

Another object of this invention is to provide a novel method of removing scale from surfaces which can be effectively used under high pressure conditions.

A further object of this invention is to provide a novel method and treating solution for the quick removal of water insoluble scales such as sulfate scales from a surface.

According to one embodiment of this invention, water insoluble scales are removed from surfaces by contacting the scales with a solution containing an effective proportion of a scale converter for ionizing the insoluble scale together with an effective proportion of a chelating agent for complexing with cations of the scale in solution. The solution containing the dissolved and complexed scale can then be removed from the surface.

According to an other embodiment of this invention, a novel scale converting solution is provided which comprises synergistic proportions of the above-described scale converter and chelating agent.

According to a preferred embodiment of this invention, a novel sulfate scale converting solution is provided which contains synergistic proportions of a water soluble bicarbonate for converting and ionizing the sulfate scale, and a chelating agent for complexing with cations released during the converting action.

The scale converting solution of this invention generally comprises an inert solvent, preferably deionized water, which can contain up to about 70 weight percent of a freeze point depressant such as methanol or a glycol, such as diethylene glycol, and synergistically effective proportions of a scale converter and a scale chelating or sequestering agent. In addition, the solution can contain up to about 1 weight percent of a surfactant effective for dispersing or emulsifying petroliferous materials.

Examples of suitable chelating or sequestering agents which can be used in the scope of this invention include the ammonium, amine, hydroxyalkylamine and alkali metal salts of an alkylenepolyamine polycarboxylic acids, nitrilotriacetic acid (NTA), and N-2 hydroxyethylamino diacetic acid (OHEtIDA) and mixtures thereof, and most preferably, the ammonium and potassium salts of said agents. The preferred alkylenepolyamine polycarboxylic acids generally have the structural formula:

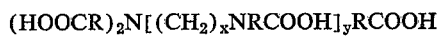

where $x$ and $y$ can each independently be an integer from 1 to 4 and R is selected from methyl, ethyl, propyl, and isopropyl groups and furthermore, wherein up to $x$ of the carboxyalkyl groups can be replaced by $\beta$-hydroxyethyl groups. Examples of suitable alkylenepolyamine polyacetic acids include: ethylenediamine tetraacetic acid (EDTA), ethylenetriamine pentacetic acid (ETPA), propylene-1,2-diamine tetraacetic acid, propylene-1,3-diamine tetraacetic acid, and the isomeric butylene diamine tetraacetic acids.

Any scale converter can be used in the scope of this invention which will react with and ionize the scale to be removed and yet is non-deleterious to the chelating agent.

Examples of suitable converting agents include the ammonium and alkali metal carbonates, bicarbonates, phosphates, oxalates, and hydroxides and most preferably the bicarbonates. In addition, the normally liquid lower alkyl amines (about 2–10 carbon atoms) and the hydroxy substituted derivatives thereof can be utilized as scale converters within the scope of this invention. Examples of suitable such amines include n-butylamine, n-amylamine, monoethanolamine, 2-amino-1-butanol, 2-amino-1-propanol, 3-aminopropanol, 2-amino heptane, 2-amino-2-methyl-1-propanol, and the like.

In most instances, the solution should contain at least about 0.06 mole per liter of the converter and at least about 0.15 mole per liter of the chelating agent with a mole ratio of the converter to the chelating agent in the range of from 0.05 to 5.0. The preferred amounts include from 0.6 to 0.8 mole per liter of the converter and from 0.3 to 0.5 mole per liter of the chelating agent. The solution can be as concentrated as desired with the converting agent and chelating agent within the molar ratio range as defined above up to the solubility limit of the constituents within the solvent.

As stated above, the solvent is preferably deionized water and can contain up to about 70 weight percent of a freeze point depressant which can include the lower alkanols having up to about 10 carbon atoms and glycols, such as diethylene glycol and salts such as the alkali metal halides, e.g., sodium chloride. The amount of freeze point depressant will vary with the external conditions. For example, approximately 8 weight percent of the freeze point depressant will lower the freezing point of the solution to about 0° F. Thus, the addition of the freeze depressant will provide for a rather wide temperature operability range. The maximum temperature is generally the boiling point of the solvent and the constituents.

In addition, it is within the scope of this invention to include up to about 1 weight percent, and preferably from about 0.3 to 0.5 weight percent of a surfactant in the treating fluid of this invention. It is preferably to utilize such surfactant whenever the scale to be removed carries and/or contains a petroliferous material. The surfactant can be any conventional material which will water wet and oil surface, and includes either nonionic or ionic materials. Such surfactants include alkali metal salts of alkyl aryl sulfonates such as sodium dodecylbenzene sulfonate, alkali metal salts of sulfates of fatty alcohols such as sodium lauryl sulfate, quaternary ammonium halides such as benzethonium chloride, and materials having a polyoxyethylene chain. Preferably the surfactants are nonionic in nature. Suitable such materials include not only the ethoxylated materials but the alkyl aryl substituted betaines.

The contact time for treating the scale with the above-described solution will vary with not only the conditions but with the relative proportions of the constituents in the solution, and will generally be in the range of from about 1 minute to about 48 or more hours.

The above-described solution of this invention is highly efficient for removing insoluble sulfate scale such as calcium sulfate (gypsum). It can also be used to remove various carbonates, oxides, phosphates and oxylates, such as calcium oxylate. For example, the oxalate converters together with the chelating agents can be used in the scope of this invention to remove water insoluble sulfate, phosphate, sulfide and carbonate scales. Similarly, the phosphate converters can be used with the chelating agents in accordance with this invention to remove water insoluble sulfate, carbonate and sulfide scales.

The treating solution of this invention can also be used in a two-step conversion process. For example, if the scale to be treated contains a substantial amount of hydroxyapatite, then it can be pretreated with sulfuric acid to form the corresponding sulfates. For example, a 10% to 15% solution of sulfuric acid. The resulting sulfates are then easily removed with the treating solution of this invention. The preferred sulfate scale removing treating solution of this invention utilizes a water soluble bicarbonate, preferably an ammonium or potassium bicarbonate as the scale converter. In this instance, the pH of the solution should be maintained above 6.

The following examples are given to further illustrate this invention and are not intended to limit the scope thereof.

EXAMPLE 1

A scale-treating solution of this invention was formulated by initially admixing 40 milliliters of the diammonium salt of ethylenediamine tetraacetic acid, (EDTA) which was 40% active as (EDTA) acid having a specific gravity of 1.187 grams per milliliter at 75° F., with 60 milliliters of deionized water to yield a solution having a pH of 5. Next, ammonium hydroxide was added to the solution to yield a pH of 7, and 8 grams of ammonium bicarbonate was dissolved in the solution. After that, 0.5 milliliter of the Velvatex B.A. [a trademark for a nonionic surfactant which is manufactured by the Texilana Corp., California, and is an aryl (coco fatty) amido betaine] was thoroughly admixed in the solution. Next, a 50 milliliter sample of the solution was placed in a receptacle and one gram of gypsum crystals was added thereto. The gypsum crystals all dissolved in 45 minutes. After the 45 minute dissolution period, one more gram of gypsum crystals was added to the sample solution, and it was completely dissolved in 1 hour and 15 minutes. After this, three large gypsum crystals which were approximately ¼" x ¹⁄₁₆" were added to the sample solution and they immediately dissolved.

EXAMPLE 2

A scale-treating solution of this invention was formulated by initially adding 10 grams of nitrilotriacetic acid (NTA) to 200 milliliters of deionized water. Next, 7.9 milliliters of ammonium hydroxide was added to the solution to yield a pH of 7. After this, 8 grams of ammonium bicarbonate was dissolved in the solution and then 0.5 milliliter of Velvatex B.A. was added. 50 milliliters of the solution was added to a receptacle and 1 gram of gypsum then added thereto, which dissolved very rapidly. Next, 70 milliliters of the original solution was placed in a receptacle to which 4.5 milliliters of ammonium hydroxide and 0.5 gram of NTA was added to yield a pH of 7. 50 milliliters of this solution was placed in another receptacle and 1 gram of gypsum crystals added thereto which dissolved very rapidly.

EXAMPLE 3

A scale-treating solution was formulated by initially mixing 32 milliliters of methanol with 127.2 milliliters of deionized water. Next, 24 grams of ethylenediamine tetraacetic acid was dissolved in this solution, and 10 milliliters of ammonium hydroxide was added to yield a pH of 8. After that, 12.6 grams of ammonium bicarbonate was dissolved in the solution and 0.8 milliliter of Velvatex B.A. was added thereto. The treating solution had the properties shown in Table I below:

Table I

| | |
|---|---|
| Specific gravity | 1.067 at 75° F. |
| pH | 8.0 |
| Boiling point | 212° F. |
| Pour point | Below —10° F. |
| Freezing point | Below 0° F. |
| Viscosity | 1 centipoise at 75° F. |

A portion of this treating solution was placed in a freezer overnight and maintained at —23° C. to yield a soft slushy opaque-appearing solution which was still very active. Next, a 50 milliliter sample of the treating solution was placed in a receptacle and 1 gram of powdered $CaSO_4 \cdot 2H_2O$ was added thereto and slowly stirred.

In 1 minute all of the calcium sulfate had dissolved. After that, 1 gram of powdered $CaSO_4 \cdot 2H_2O$ was added to the sample solution and dissolved in 2 minutes, and then a third 1 gram portion of the $CaSO_4 \cdot 2H_2O$ was added to the sample solution and again dissolved in 2 minutes.

EXAMPLE 4

Next, a solution similar to that used in Example 3 was formulated by admixing 1860 milliliters of water with 369 milliliters of methanol and 348 grams of ethylenediamine tetraacetic acid. After that 285 milliliters of ammonium hydroxide, and then 216 grams of ammonium bicarbonate with 12 milliliters of Velvatex B.A. was added to the solution. The solution was used to treat powdered limestone (Violia), dolomite (Clearfork), barium sulfate, marble (Alabama cream), and calcium carbonate. Sample proportions of these powdered materials were dried for 13 hours in an oven at 220° F. and then allowed to cool. Next, 50 milliliters of the above-described treating solution was added to each of the samples and placed in an oven at 125° F. for 24 hours. After that, each sample powder was washed with deionized water and redried in the oven at 230° F. for 14 hours. The results of the test are indicated in Table II below:

TABLE II

| Material | Weight of total sample (grams) | Weight of the sample lost during treatment (grams) | Percent lost |
| --- | --- | --- | --- |
| Limestone | 0.6366 | 0.3666 | 57.6 |
| Dolomite | 0.9130 | 0.2281 | 25.9 |
| Marble | 0.5819 | 0.3850 | 66.2 |
| Barium sulfate | 0.8330 | 0.6445 | 77.4 |
| Calcium carbonate | 0.3974 | 0.3684 | 92.7 |

EXAMPLE 5

A treating solution was formulated by admixing 480 grams of nitrilotriacetic acid (NTA) with 3000 milliliters of deionized water. Next, 380 milliliters of ammonium hydroxide was added to yield a pH of between 8 and 9. After that, 384 grams of ammonium bicarbonate was added and 25 milliliters of Velvatex B.A. to yield a solution having a pH of 8. Next, 1780 milliliters of deionized water was added. This solution was utilized in a dynamic flow test to treat a length of 8" x 2" I.D. pipe, having a gypsum scale encrusted therewithin. The weight of the test pipe and scale was 1442.6 grams. The test solution was continuously recycled through the length of pipe for 7 hours at a pressure of from 330 to 505 p.s.i. and a temperature from 81° to 98° F. After the run, more than 50% of the scale had dissolved. Specifically, the treatment had removed 235.6 grams of the scale. The specific gravity of the treating solution before the treatment was 1.0685 and after the treatment was 1.0895.

EXAMPLE 6

Another length of test pipe was subjected to dynamic scale treating testing, such as in Example 5 above, but using a solution formed by initially admixing 956 milliliters of methanol, 2044 milliliters of water with 717 grams of ethylenediamine tetraacetic acid. After that 500 milliliters of ammonium hydroxide was added to yield a pH of 8. Next, 443 grams of ammonium bicarbonate was dissolved in the solution and 23 milliliters of Velvatex B.A. was added. Lastly, 1781 milliliters of deionized water was added. The test pipe was 8" long with a 2" I.D., weighed 1,091 grams and contained 386.8 grams of gypsum scale therein. The treating solution was passed through the pipe section for 8 hours, at an average pressure of about 500 p.s.i. and an average temperature of 80° F. The resulting weight of the pipe and scale was 1146.2 grams which indicated an 88.4% loss of the scale. In addition, the remaining 45 grams of scale easily slipped out of the pipe.

EXAMPLE 7

A treating solution having a formulation substantially the same as the solution utilized in Example 4 was used to treat an oil well. The oil well was a conventional producing well having a six inch casing and a tubing operatively positioned therein. The inside and outside of the tubing, and the inside of the casing had a heavy sulfate scale encrusted thereon. Before treatment the well had a total production of 86 b.p.d. (barrels per day) of which 46 b.p.d. was oil and 40 b.p.d. was water with an oil-to-water ratio of 1.15. The above-described treating solution was continuously circulated down the annulus between the casing and tubing and up the tubing for a total of 36 hours. After treatment, the well had an increased production of 105 b.p.d., of which 63 b.p.d. was oil and 42 b.p.d. was water with an oil-to-water ratio of 1.5. Thus the treatment in accordance with this invention yielded a 31.2% flow increase from the well with an increase in oil production of 37%.

EXAMPLE 8

This example is given to illustrate the synergistic action of the treating solution of this invention. First, 4 sample solutions (numbered 1 through 4, respectively) were formulated which contained 50 milliliters of varying compositions of a diammonium salt of ethylenediamine tetraacetic acid in deionized water, 3.15 grams of ammonium bicarbonate (0.616 mole per liter), 4.0 milliliters of methanol and 0.2 milliliter of Velvatex B.A., each solution having a pH of 7. The first sample solution contained 11.3 weight percent EDTA (0.386 mole per liter), the second solution contained 6.78 weight percent EDTA (0.232 mole per liter), the third sample solution contained 4.52 weight percent EDTA (0.154 mole per liter) and the fourth sample solution contained 2.2 weight percent EDTA (0.075 mole per liter). The four above-described sample solutions were tested as follows:

Sample solution No. 1

1 gram of $CaSO_4 \cdot 2H_2O$ was added to sample solution No. 1 and was completely dissolved in 2 minutes. Next, 1 more gram of $CaSO_4 \cdot 2H_2O$ was added to sample solution No. 1 and was completely dissolved in 15 minutes.

Sample solution No. 2

1 gram of $CaSO_4 \cdot 2H_2O$ was added to this sample solution and was mostly dissolved in 2 minutes. Only a very slight trace of a precipitate was left after 5 minutes. After this period, another gram of $CaSO_4 \cdot 2H_2O$ was added and was substantially dissolved after 1 hour.

Sample solution No. 3

1 gram of $CaSO_4 \cdot 2H_2O$ was added to this sample solution and after 5 minutes about ½ had dissolved. After 2 hours, a slight precipitate was left.

Sample solution No. 4

1 gram of $CaSO_4 \cdot 2H_2O$ was added to this sample solution and after 2 hours about one-half of the material had not yet dissolved.

Next, several runs were made utilizing five sample solutions, (numbered 5–9, respectively,) each comprising 50 milliliters of deionized water containing 11.3 weight percent (0.386 mole per liter) of the diammonium salt of ethylenediamine tetraacetic acid, with varying amounts of ammonium bicarbonate, 4.0 milliliters of methanol, and 0.2 milliliter of Velvatex B.A., each having a pH of 7. Sample solution No. 5 had 6.3 weight percent (0.616 mole per liter) ammonium bicarbonate. Sample solution No. 6 had 3 weight percent (0.293 mole per liter) ammonium bicarbonate. Sample solution No. 7 had 1.5 weight percent (0.147 mole per liter) ammonium bicarbonate. Sample solution No. 8 had 0.5 weight percent (0.049 mole per liter) ammonium bicarbonate. Sample solution No. 9 had 0 weight percent ammonium bicarbonate.

Sample solution No. 5

1 gram of $CaSO_4 \cdot 2H_3O$ was added to sample solution and it completely dissolved within 2 minutes. Next, another gram of $CaSO_4 \cdot 2H_2O$ was added to this sample solution and it had completely dissolved within 23 minutes.

Sample solution No. 6

1 gram $CaSO_4 \cdot 2H_2O$ was added to the sample solution and it had completely dissolved in about 20 minutes. Next, another gram of $CaSO_4 \cdot 2H_2O$ was added to the sample solution and it had dissolved within 23 minutes.

Sample solution No. 7

1 gram of $CaSO_4 \cdot 2H_2O$ was added to sample solution No. 7 and it completely dissolved in 20 minutes. Next, 1 more gram of $CaSO_4 \cdot 2H_2O$ was added and it had dissolved in 1 hour and 7 minutes.

Sample solution No. 8

1 gram of $CaSO_4 \cdot 2H_2O$ was added to sample solu- No. 8 and it completely dissolved in about 20 minutes. After this, another gram of $CaSO_4 \cdot 2H_2O$ was added and it had substantially dissolved in approximately 1 hour and 6 minutes. Only some very small particles were left undissolved.

Sample solution No. 9

1 gram of $CaSO_4 \cdot 2H_2O$ was added to sample solution No. 9 and it never completely dissolved. About 30 minutes later, another gram of $CaSO_4 \cdot 2H_2O$ was added, and about an hour later, at least 25% of the material was left. After 2 hours at least 25% of the $CaSO_4 \cdot 2H_2O$ had still not dissolved.

The above examples clearly illustrate some of the preferred improved treating solutions of this invention. However, it is quite apparent that various modifications of this invention will now be apparent to one skilled in the art from a reading of this specification, and it is intended to cover such modifications as fall within the scope of the appended claims. For example, the scale treating solution of this invention can be maintained in the circulating water of a boiler to prevent scale build-up, or in other similar operations.

I claim:

1. A method of removing a water insoluble scale from a surface comprising:
    (a) contacting said scale with a solution comprising scale removing materials consisting essentially of an effective amount of a scale converter selected from ammonium and alkali metal carbonates, bicarbonates, hydroxides, phosphates, oxylates, and normally liquid lower alkyl amines and hydroxy substituted derivatives thereof for ionizing at least portions of said scale, and an effective proportion of a chelating agent selected from ammonium, amine, hydroxyalkyl amine, and alkali metal salts of alkylenepolyamine polycarboxylic acids, nitrilotriacetic acid, and N-2-hydroxyethylamine diacetic acid for sequestering ions of said scale after ionization by said scale converter, and allowing said solution to remain in contact with said scale sufficiently to cause said ionization and sequestration; and
    (b) removing said solution containing said dissolved scale from said surface.

2. The method of claim 1 wherein said scale comprises a material selected from water insoluble sulfates, carbonates, phosphates, oxalates, and oxides.

3. The method of claim 2 wherein said alkylenepolyamine polycarboxylic acid has the formula $$(HOOCR)_2N[(CH_2)_xNRCOOH]_yRCOOH$$

wherein $x$ and $y$ are each an integer from 1 to 4, R is selected from methyl, ethyl, propyl and isopropyl groups and wherein up to $x$ of the carboxyalkyl groups can be replaced by $\beta$-hydroxyethyl groups.

4. The method of claim 3 wherein said solution contains at least 0.06 mole per liter of said converter and at least 0.15 mole per liter of said chelating agent, and wherein the mole ratio between said converter and said chelating agent is in the range of from 0.05 to 5.0.

5. The method of claim 4 wherein said scale is a water insoluble sulfate scale.

6. The method of claim 4 wherein said scale is selected from water insoluble sulfate, phosphate, sulfide, and carbonate scales and said converter is an oxylate.

7. The method of claim 4 wherein said scale is selected from water insoluble sulfate, carbonate, and sulfides, and said scale converter is a phosphate.

8. A method of removing water insoluble scales selected from water insoluble sulfates, carbonates, and oxides from a surface comprising:
    treating said surface with a solution which comprises scale removing materials consisting essentially of at least 0.06 mole per liter of said solution of a converter selected from ammonium and alkali metal bicarbonates, at least 0.15 mole per liter of said solution of a chelating agent selected from ammonium, amine, hydroxyalkyl amine, and alkali metal salts of alkylenepolyamine polyacetic acids, nitrilotriacetic acids, and N - 2 - hydroxyethyliminodiacetic acid, wherein the mole ratio of said converter to said chelating agent is in the range of from 0.05 to 5.0, and wherein said solution has a pH of at least 6, said treating occurring for a time sufficient to dissolve at least portions of said water insoluble scale, and thereafter removing said solution from said surface.

9. The method of claim 8 wherein said water insoluble sulfate scale is formed by initially reacting a water insoluble phosphate scale with sulfuric acid prior to said treating.

10. The method of claim 8 wherein said scale further comprises a petroliferous substance and said treating solution further comprises up to 1 weight percent of a surfactant for dispersing said petroliferous substance.

11. The method of claim 10 wherein said surfactant is a nonionic surfactant.

12. The method of claim 8 wherein said treating is carried out at a temperature up to the temperature at which said solution vaporizes.

13. A treating solution for removing a water insoluble scale comprising an inert solvent containing scale removing materials consisting essentially of an effective amount of a converter selected from ammonium and alkali metal carbonates, bicarbonates, hydroxides, phosphates, oxylates, and normally liquid lower alkyl amines and hydroxy substituted derivatives thereof for ionizing said scale and an effective amount of a chelating agent selected from ammonium, amine, hydroxyalkyl amine, and alkali metal salts of alkylenepolyamine polycarboxylic acids, nitrilotriacetic acid, and N-2-hydroxyethylamino diacetic acid for sequestering cations of said scale which are ionized by said converter.

14. The treating solution of claim 13 wherein said alkylenepolyamine polycarboxylic acid has the formula $(HOOCR)_2N[(CH_2)_xNRCOOH]_yRCOOH$ wherein $x$ and $y$ are each an integer from 1 to 4, R is selected from methyl, ethyl, propyl and isopropyl groups and wherein up to $x$ of the carboxyalkyl groups can be replaced by $\beta$-hydroxyethyl groups.

15. The treating solution of claim 14 containing at least 0.06 mole per liter of said converter, at least 0.15 mole per liter of said chelating agent and wherein the mole ratio of said converter to said chelating agent is in the range of from 0.05 to 5.0.

16. The treating solution of claim 15 wherein said solvent is water.

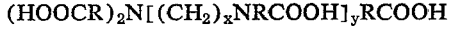

17. The solution of claim 15 wherein said converter is selected from ammonium and alkali metal bicarbonates.

18. The treating solution of claim 17 wherein said chelating agent is an ammonium salt of ethylenediamine tetraacetic acid.

19. The treating solution of claim 17 wherein said chelating agent is an ammonium salt of nitrilotriacetic acid.

20. The solution of claim 17 wherein said freeze point depressant is methanol.

21. The solution of claim 17 wherein said surfactant is an aryl (coco fatty) amido bentaine.

22. The treating solution of claim 13 further comprising up to 70 weight percent of a freeze point depressant.

23. The treating solution of claim 22 further comprising up to 1 weight percent of a surfactant.

References Cited

UNITED STATES PATENTS

| | | | |
|---|---|---|---|
| 3,360,399 | 12/1967 | Knox | 252—80 X |
| 3,235,324 | 2/1966 | Merriman | 21—2.7 |
| 2,396,938 | 3/1946 | Bersworth | 252—86 X |
| 2,544,649 | 3/1951 | Bersworth | 252—86 X |
| 3,110,684 | 11/1963 | Miller | 252—389 |
| 3,296,027 | 1/1967 | Jacklin | 134—3 |
| 3,491,027 | 1/1970 | Baker | 252—86 |

ROBERT F. BURNETT, Primary Examiner

M. E. McCAMISH, Assistant Examiner

U.S. Cl. X.R.

21—2.7; 134—2; 210—59; 252—8.55 B, 82, 180, 181

PO-1050
(5/69)

UNITED STATES PATENT OFFICE
CERTIFICATE OF CORRECTION

Patent No. 3,684,720                Dated August 15, 1972

Inventor(s) Darwin W. Richardson

It is certified that error appears in the above-identified patent and that said Letters Patent are hereby corrected as shown below:

Claim 20, line 1 "17" should be --22--.

Signed and sealed this 23rd day of January 1973.

(SEAL)
Attest:

EDWARD M. FLETCHER, JR.
Attesting Officer

ROBERT GOTTSCHALK
Commissioner of Patents

Disclaimer 3,684,720.—*Darwin W. Richardson*, Richardson, Tex. REMOVAL OF SCALE FROM SURFACES. Patent dated Aug. 15, 1972. Disclaimer filed Sept. 28, 1973, by the assignee, *The Western Company*.

Hereby enters this disclaimer to claims 1–23, all of the claims, of said patent.

[*Official Gazette June 10, 1975.*]